United States Patent
Sugidomari

(10) Patent No.: US 12,469,330 B2
(45) Date of Patent: Nov. 11, 2025

(54) VIDEO PROCESSING SYSTEM, VIDEO PROCESSING METHOD, AND NON-TRANSITORY COMPUTER-READABLE MEDIUM

(71) Applicant: NEC Corporation, Tokyo (JP)

(72) Inventor: Daisuke Sugidomari, Tokyo (JP)

(73) Assignee: NEC CORPORATION, Tokyo (JP)

( * ) Notice: Subject to any disclaimer, the term of this patent is extended or adjusted under 35 U.S.C. 154(b) by 143 days.

(21) Appl. No.: 18/274,654

(22) PCT Filed: Jul. 6, 2021

(86) PCT No.: PCT/JP2021/025424
§ 371 (c)(1),
(2) Date: Jul. 27, 2023

(87) PCT Pub. No.: WO2023/281620
PCT Pub. Date: Jan. 12, 2023

(65) Prior Publication Data
US 2024/0096131 A1  Mar. 21, 2024

(51) Int. Cl.
*G06V 40/16* (2022.01)
*G06V 10/762* (2022.01)
*G06V 40/50* (2022.01)

(52) U.S. Cl.
CPC .......... *G06V 40/172* (2022.01); *G06V 10/762* (2022.01); *G06V 40/171* (2022.01); *G06V 40/50* (2022.01)

(58) Field of Classification Search
CPC .. G06V 40/172; G06V 10/762; G06V 40/171; G06V 40/50; G06V 40/173; G06V 40/103; H04N 7/18
See application file for complete search history.

(56) References Cited

U.S. PATENT DOCUMENTS

2003/0048926 A1  3/2003  Watanabe
2012/0308090 A1  12/2012  Sukegawa et al.
(Continued)

FOREIGN PATENT DOCUMENTS

CN  111079481 A  *  4/2020  ......... G06F 18/2431
JP  2003-087771 A  3/2003
(Continued)

OTHER PUBLICATIONS

International Search Report for PCT Application No. PCT/JP2021/025424, mailed on Sep. 28, 2021.

*Primary Examiner* — Mekonen T Bekele
(74) *Attorney, Agent, or Firm* — Sughrue Mion, PLLC

(57) ABSTRACT

A video processing system (10) includes: an image acquisition unit (11) that acquires at least one frame image included in video data; a skeleton information generation unit (13) that generates skeleton information based on a body region of a person included in the at least one frame image; a behavior conversion unit (14) that converts the skeleton information into a behavior ID; a person specifying unit (18) that specifies, based on a facial region of the person included in the at least one frame image, a person ID for identifying features of a person estimated to be an identical person; and a registration unit (20) that registers the behavior ID, the person ID, and scene-related information related to the at least one frame image in a database in association with each other.

20 Claims, 14 Drawing Sheets

(56) References Cited

U.S. PATENT DOCUMENTS

| | | |
|---|---|---|
| 2015/0294481 A1 | 10/2015 | Sakaue |
| 2018/0144074 A1 | 5/2018 | Yamaji et al. |
| 2018/0341803 A1 | 11/2018 | Matsushita et al. |
| 2022/0383653 A1 | 12/2022 | Yoshida et al. |

FOREIGN PATENT DOCUMENTS

| | | | |
|---|---|---|---|
| JP | 2007-006324 A | 1/2007 | |
| JP | 2012-252654 A | 12/2012 | |
| JP | 2014-155693 A | 8/2014 | |
| JP | 2018-081654 A | 5/2018 | |
| JP | 2018-198056 A | 12/2018 | |
| WO | WO-2021084677 A1 * | 5/2021 | ............. G06V 40/23 |

* cited by examiner

VIDEO PROCESSING SYSTEM, VIDEO PROCESSING METHOD, AND NON-TRANSITORY COMPUTER-READABLE MEDIUM

This application is a National Stage Entry of PCT/JP2021/025424 filed on Jul. 6, 2021, the contents of all of which are incorporated herein by reference, in their entirety.

TECHNICAL FIELD

The present disclosure relates to a video processing system, a video processing method, and a non-transitory computer-readable medium.

BACKGROUND ART

In program production for a broadcasting business, there is a demand to search for information about scenes, in which a specific performer appears in a program video, with a simple keyword search. Such a demand applies not only to the broadcasting business, but also to a field of surveillance where information on a specific person is investigated. For example, Patent Literature 1 discloses a facial image search system that searches for a person from a database that stores facial features extracted from a facial image and attributes determined based on facial information as one piece of personal information.

CITATION LIST

Patent Literature

Patent Literature 1: Japanese Unexamined Patent Application Publication No. 2012-252654

SUMMARY OF INVENTION

Technical Problem

Here, there is a demand in the broadcasting business, the surveillance field, or the like to search for information about a scene showing "specific behavior" of a specific person included in a video with a simple keyword search. However, according to Patent Literature 1 described above, search results cannot be narrowed down using specific behavior as a search key. Therefore, in order to realize such a search, it is required to store information indicating that a specific person performs specific behavior in a database in association with a simple keyword.

In view of the above-described problem, an object of the present disclosure is to provide a video processing system, a video processing method, and a non-transitory computer-readable medium that can easily accumulate information about a scene in which a specific person performs specific behavior.

Solution to Problem

An aspect of the present disclosure provides a video processing system including:
  image acquisition means for acquiring at least one frame image included in video data;
  skeleton information generation means for generating skeleton information based on a body region of a person included in the at least one frame image;
  behavior conversion means for converting the skeleton information into a behavior ID;
  person specifying means for specifying, based on a facial region of the person included in the at least one frame image, a person ID for identifying features of a person estimated to be an identical person; and registration means for registering the behavior ID, the person ID, and scene-related information related to the at least one frame image in a database in association with each other.

An aspect of the present disclosure provides a video processing method including:
  acquiring at least one frame image included in video data;
  generating skeleton information based on a body region of a person included in the at least one frame image;
  converting the skeleton information into a behavior ID;
  specifying, based on a facial region of the person included in the at least one frame image, a person ID for identifying features of a person estimated to be an identical person; and
  registering the behavior ID, the person ID, and scene-related information related to the at least one frame image in a database in association with each other.

An aspect of the present disclosure provides a non-transitory computer-readable medium storing a program that causes a computer to execute:
  an image acquisition process of acquiring at least one frame image included in video data;
  a skeleton information generation process of generating skeleton information based on a body region of a person included in the at least one frame image;
  a behavior conversion process of converting the skeleton information into a behavior ID;
  a person specifying process of specifying, based on a facial region of the person included in the at least one frame image, a person ID for identifying features of a person estimated to be an identical person; and
  a registration process of registering the behavior ID, the person ID, and scene-related information related to the at least one frame image in a database in association with each other.

Advantageous Effects of Invention

According to the present disclosure, it is possible to provide a video processing system, a video processing method, and a non-transitory computer-readable medium that can easily accumulate information about a scene in which a specific person performs specific behavior.

EXAMPLE EMBODIMENTS

Figure 1:
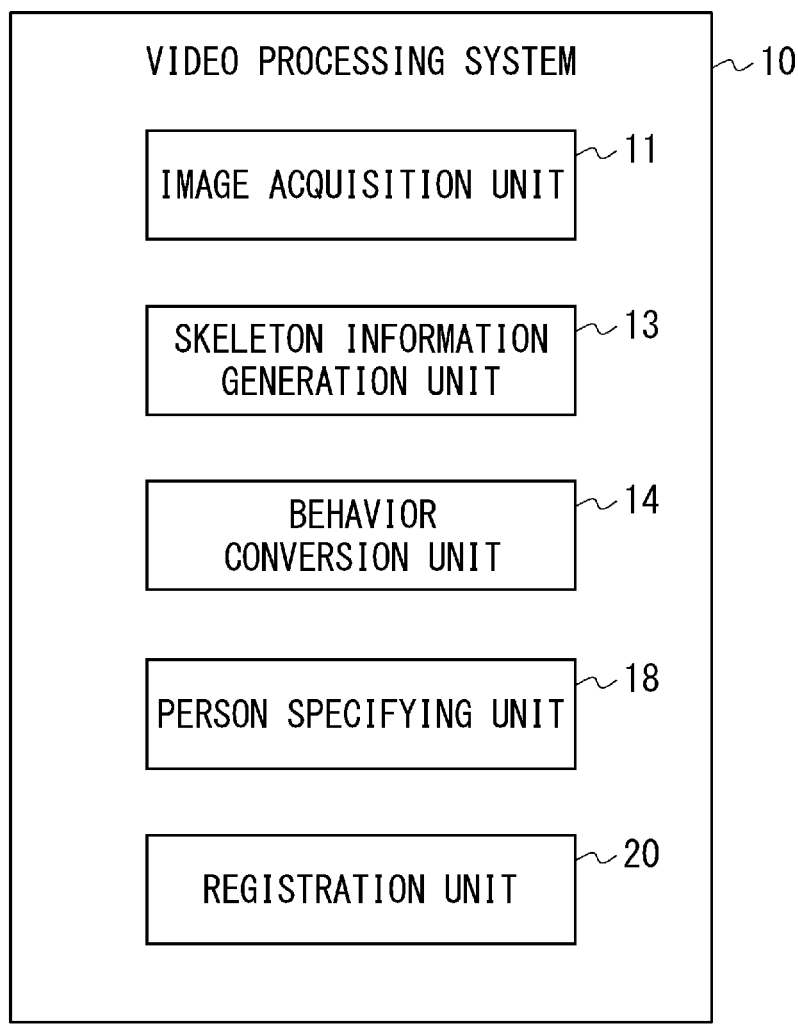
FIG. 1 is a block diagram showing a configuration of a video processing system according to a first example embodiment.

Hereinafter, the present disclosure will be described through example embodiments, but the disclosure according to the scope of claims is not limited to the following example embodiments. Moreover, all configurations described in the example embodiments are not necessarily essential as means for solving the problems. In each of the drawings, the same components are denoted by the same reference numerals, and will not be described repeatedly as necessary.

First Example Embodiment

First, a first example embodiment of the present disclosure will be described. FIG. 1 is a block diagram showing a configuration of a video processing system 10 according to a first example embodiment. The video processing system 10 is a computer system that generates, from video data, a search database (DB) in which an ID of a person (person ID) appearing in the video data, a behavior ID indicating behavior of the person, and information related to an appearance scene are associated with each other. The person ID is information for identifying features of a person who is presumed to be the same person, and is a person's name, for example. The behavior ID is information for identifying behavior, and is a behavior name, for example. Examples of the behavior name may include "falling down", "sitting down", "playing baseball", and "playing soccer".

The video processing system 10 includes an image acquisition unit 11, a skeleton information generation unit 13, a behavior conversion unit 14, a person specifying unit 18, and a registration unit 20.

The image acquisition unit 11 is also called an image acquisition means. The image acquisition unit 11 acquires at least one frame image included in video data.

The skeleton information generation unit 13 is also called a skeleton information generation means. The skeleton information generation unit 13 generates skeleton information based on a body region of a person included in at least one frame image acquired by the image acquisition unit 11. The body region of the person is an image region representing at least a part of the body of the person, and is sometimes called a body image. The skeleton information is information including "keypoints", which are feature points of joints or the like and "bones (bone links)" which indicate links between the keypoints. In the following, unless otherwise specified, the "keypoints" correspond to "joints" of a person, and the "bones" correspond to "bones" of a person.

The behavior conversion unit 14 is also called a behavior conversion means. The behavior conversion unit 14 converts at least one skeleton information generated by the skeleton information generation unit 13 into an behavior ID.

The person specifying unit 18 is also called a person specifying means. The person specifying unit 18 specifies a person ID based on a facial region of the person included in at least one frame image acquired by the image acquisition unit 11. The facial region of the person is an image region representing a face of the person, and is sometimes called a facial image.

The registration unit 20 is also called a registration means. The registration unit 20 registers the behavior ID converted by the behavior conversion unit 14, the person ID specified by the person specifying unit 18, and scene-related information related to at least one frame image in a search DB (not shown) in association with each other. The scene-related information is information about a scene corresponding to the frame image. For example the scene-related information may include image metadata, may include the acquired frame image itself, or may include the video data itself including the frame image. The image metadata may be, for example, a capturing time and broadcasting time of the frame image, a capturing location, a program name of video data including the frame image, a corner name in the program corresponding to the frame image.

Figure 2:
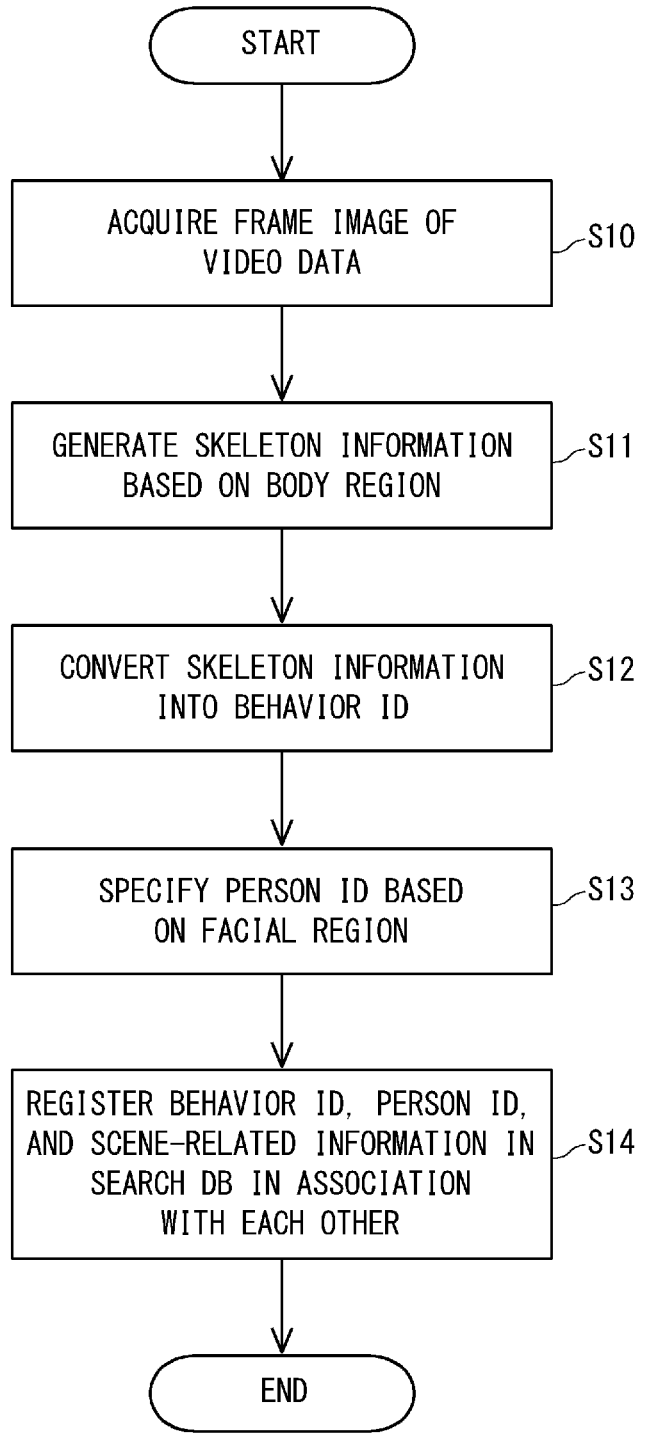
FIG. 2 is a flowchart showing a flow of a video processing method according to the first example embodiment.

FIG. 2 is a flowchart showing a flow of a video processing method according to the first example embodiment. First, the image acquisition unit 11 of the video processing system 10 acquires a frame image included in video data (S10). Next, the skeleton information generation unit 13 generates skeleton information based on the body region of the person included in the frame image (S11). Next, the behavior conversion unit 14 converts the skeleton information into a behavior ID (S12). Next, the person specifying unit 18 specifies the person ID based on the facial region of the person included in the frame image (S13). Next, the registration unit 20 registers the behavior ID, the person ID, and the scene-related information related to the frame image in the search DB in association with each other (S14).

The process of S13 may be executed earlier than steps S11 and S12, or may be executed in parallel with steps S11 and S12.

According to the first example embodiment as described above, the video processing system 10 can generate the search DB in which simple keywords of the behavior ID and the person ID are associated with the scene-related information related to the frame image. The video processing system 10 can specify the behavior ID using the skeleton information to easily specify the behavior ID from a video. Therefore, it is possible to easily accumulate information about a scene, in which a specific person performs specific behavior, in the search DB.

Second Example Embodiment

Figure 3:
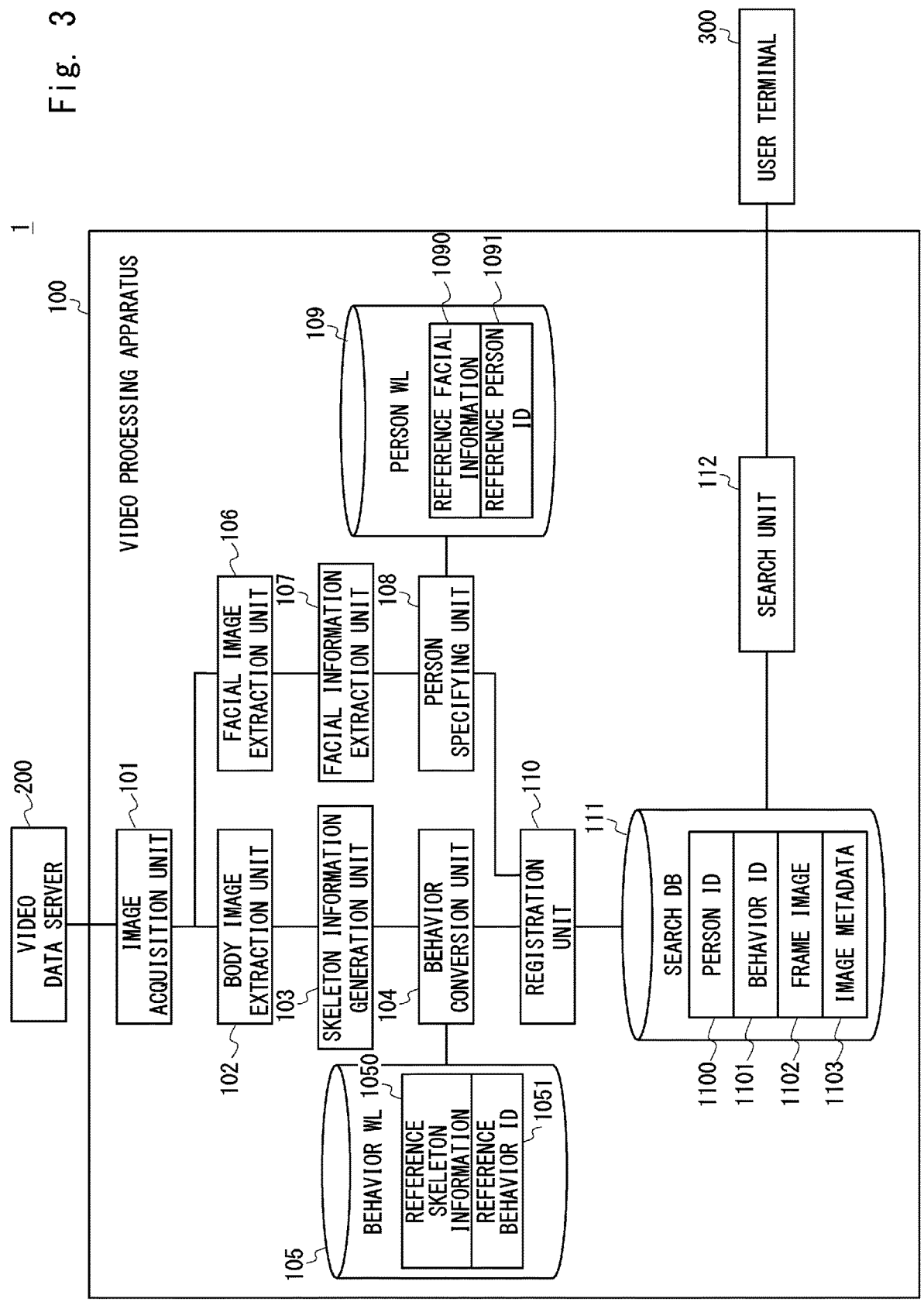
FIG. 3 is a block diagram showing a configuration of a video processing system according to a second example embodiment.

Next, a second example embodiment of the present disclosure will be described. FIG. 3 is a block diagram showing a configuration of a video processing system 1 according to a second example embodiment. The video processing system 1 is a computer system that realizes a search for information related to a video using the search DB in which the person ID, the behavior ID, and the scene-related information are associated with each other. The video processing system 1 includes a video processing apparatus 100, a video data server 200, and a user terminal 300.

The video data server 200 is a computer apparatus that accumulates video data captured using a camera unit or the like. The video data server 200 is communicably connected to the video processing apparatus 100 via a wired or wireless network. The video data server 200 transmits a series of video data to the video processing apparatus 100. Alternatively, the video data server 200 transmits pre-recorded video data to the video processing apparatus 100 in units of frames.

The user terminal 300 is a terminal apparatus used by a user who request a search. The user terminal 300 transmits a search request to the video processing apparatus 100 via a wired or wireless network (not shown), and receives a search result in response to the search request from the video processing apparatus 100.

The video processing apparatus 100 extracts, from the video data received from the video data server 200, a person ID of a person appearing in the video and a behavior ID indicating behavior of the person. Then, the video processing apparatus 100 registers the person ID, the behavior ID, and scene-related information related to the frame image, which is an appearance scene, in the search DB in association with each other. On the other hand, when receiving the search request including a search keyword from the user terminal 300, the video processing apparatus 100 refers to the search DB, and outputs (transmits) the scene-related information associated with the search keyword to the user terminal 300.

(Video Processing Apparatus 100)

Next, a specific configuration of the video processing apparatus 100 will be described. The video processing apparatus 100 includes an image acquisition unit 101, a body image extraction unit 102, a skeleton information generation unit 103, a behavior conversion unit 104, a behavior watch list (WL) 105, a facial image extraction unit 106, a facial information extraction unit 107, a person specifying unit 108, a person WL 109, a registration unit 110, a search DB 111, and a search unit 112. The components may be connected to each other.

The image acquisition unit 101 is an example of the image acquisition unit 11 described above. The image acquisition unit 101 acquires video data from the video data server 200. Then, the image acquisition unit 101 supplies a frame image included in the video data to the body image extraction unit 102 and the facial image extraction unit 106.

The body image extraction unit 102 extracts (for example, cuts out), as a body image, an image region (body region) of the body that matches a predetermined condition in the frame image. As the predetermined condition, the body image extraction unit 102 collates, for example, whether a feature amount of an image in a predetermined rectangular image region matches a feature amount of the body image set in advance. The body image extraction unit 102 supplies the extracted body image to the skeleton information generation unit 103.

The skeleton information generation unit 103 generates skeleton information of a person based on features such as joints of the person recognized in the body image, using a skeleton estimation technique using machine learning. The skeleton information generation unit 103 may use a skeleton estimation technique such as OpenPose. The skeleton information generation unit 103 supplies the skeleton information to the behavior conversion unit 104.

The behavior conversion unit 104 uses the behavior WL 105 to specify a behavior ID associated with the skeleton information. The behavior WL 105 is a storage apparatus that stores information in which reference skeleton information 1050 and reference behavior ID 1051 are associated with each other. The reference skeleton information 1050 and the reference behavior ID 1051 are skeleton information extracted from a reference image registered in advance in the behavior WL 105 and a behavior ID specified from the reference image.

Specifically, first, the behavior conversion unit 104 specifies, from the reference skeleton information 1050 registered in the behavior WL 105, reference skeleton information 1050 in which a degree of similarity with the skeleton information generated by the skeleton information generation unit 103 is equal to or greater than a predetermined threshold. Then, the behavior conversion unit 104 specifies the reference behavior ID 1051 associated with the specified reference skeleton information 1050, as a behavior ID corresponding to the person included in the acquired frame image.

The behavior conversion unit 104 may specify one behavior ID based on skeleton information corresponding to one frame image, or may specify one behavior ID based on time-series data of skeleton information corresponding to each of a plurality of frame images. When specifying one behavior ID using a plurality of frame images, the behavior conversion unit 104 may extract only skeleton information with large movement, arrange the extracted skeleton information, and generate time-series data for collating with the behavior WL 105. Extracting only skeleton information with large movement may mean extracting skeleton information in which the amount of change in skeleton information of frame images adjacent to each other is equal to or greater than a predetermined amount. Thus, a computational load can be reduced, and the behavior detection can be made robust.

Here, various methods other than the method described above are conceivable for specifying the behavior ID. For example, there is a method of estimating an behavior ID from a target frame image, by using a behavior estimation model in which a frame image correctly assigned with an behavior ID is trained as learning data. However, it is difficult to collect the learning data, and costs get high. Further, for example, when a part of the person's body is hidden, the behavior of the person may not be detected. Whereas, in the present second example embodiment, the skeleton information is used to estimate the behavior ID, and compares with the skeleton information registered in advance by utilizing the behavior WL 105. Therefore, in the present second example embodiment, the video processing apparatus 100 can easily specify the behavior ID.

The behavior conversion unit 104 supplies the specified behavior ID to the registration unit 110.

The facial image extraction unit 106 is also called a facial image extraction means. The facial image extraction unit 106 extracts, as a facial image, an image region (facial region) of the face that matches a predetermined condition in the frame image. As the predetermined condition, the facial image extraction unit 106 collates, for example, whether a feature amount of an image in a predetermined rectangular image region matches a feature amount of the facial image set in advance. After the body image extraction unit 102 extracts a person image, the facial image extraction unit 106 may extract a facial region included in the extracted person image, as a facial image. In this case, for example, the facial image extraction unit 106 may extract a facial image based on a head position of the person region in the frame image. The facial image extraction unit 106 supplies the facial image to the facial information extraction unit 107.

The facial information extraction unit 107 is also called a facial information extraction means. The facial information extraction unit 107 extracts facial feature information from the facial image. The facial feature information is a set of feature points extracted from the facial image, and is also called facial information. The facial information extraction unit 107 supplies the extracted facial information to the person specifying unit 108.

The person specifying unit 108 uses the person WL 109 to specify a person ID associated with the facial information. The person WL 109 is a storage apparatus that stores information in which reference facial information 1090 and reference person ID 1091 are associated with each other. The reference facial information 1090 and the reference person ID 1091 are facial information extracted from a reference facial image registered in advance in the person WL 109 and a person ID specified from the reference facial image.

Specifically, first, the person specifying unit 108 specifies, from the reference facial information 1090 registered in the person WL 109, reference facial information 1090 in which a degree of similarity with the facial information extracted by the facial information extraction unit 107 is equal to or greater than a predetermined threshold. Then, the person WL 109 specifies the reference person ID 1091 associated with the specified reference facial information 1090, as a person ID for identifying the person included in the acquired frame image.

The person specifying unit 108 supplies the specified person ID to the registration unit 110.

The registration unit 110 acquires image metadata related to the frame image. For example, the registration unit 110 acquires image metadata input by an administrator of the video processing apparatus 100 via an input apparatus (not shown). The image metadata is sometimes called scene-related information together with the frame image. The registration unit 110 registers the person ID, the behavior ID, the frame image, and the image metadata in the search DB 111 in association with each other.

The search DB 111 is a storage apparatus that stores information in which the person ID 1100, the behavior ID 1101, the frame image 1102, and the image metadata 1103 are associated with each other.

The search unit 112 is called a search means. The search unit 112 receives a search request from the user terminal 300, and transmits a search result in response to the search request to the user terminal 300. For example, when receiving the search request including the person ID and the behavior ID from the user terminal 300, the search unit 112 acquires the scene-related information associated with the person ID and the behavior ID included in the search request, from the search DB 111. Then, the search unit 112 transmits the acquired scene-related information to the user terminal 300, as a search result. At this time, the search unit 112 may cause a display unit (not shown) of the user terminal 300 to display the search result. Thus, the user using the user terminal 300 can easily search for information related to scenes in which a specific person performs specific behavior.

The search unit 112 may acquire a plurality of pieces of scene-related information of images showing similar behavior of the same person from the search DB 111. In this case, the search unit 112 may select one or a plurality of pieces of scene-related information from the plurality of pieces of scene-related information acquired from the search DB 111, and transmit the selected one or the plurality of pieces of scene-related information to the user terminal 300 as search results. Thus, it is possible to avoid a situation in which a large number of similar search results are displayed on the display unit of the user terminal 300 and it is difficult for the user to obtain the desired result. An example of a method of selecting the scene-related information may include a method of using metadata of frame images corresponding to each of the plurality of pieces of scene-related information acquired from the search DB 111. For example, the search unit 112 may select the scene-related information based on image metadata of the frame image (for example, image capturing time, name of program to be broadcast, broadcasting corner name, or broadcasting time). In addition, the search unit 112 may select the scene-related information based on quality data of the frame image (for example, luminance value or degree of blurring). Such image metadata and quality data are metadata related to images, excluding person IDs and behavior IDs. As an example, when selecting the scene-related information based on the name of the program to be broadcast, the search unit 112 may search for data of one frame image for each program, among a plurality of frame images showing similar behavior of the same person, and transmit the data to the user terminal 300 as scene-related information. Further, as an example, when selecting the scene-related information based on the program name and the degree of blurring, the search unit 112 may search for data of one frame image with the least blurring for each program, and transmit the data to the user terminal 300 as scene-related information. Thus, the user can acquire a representative single image for each program in response to a search request.

Figure 4:
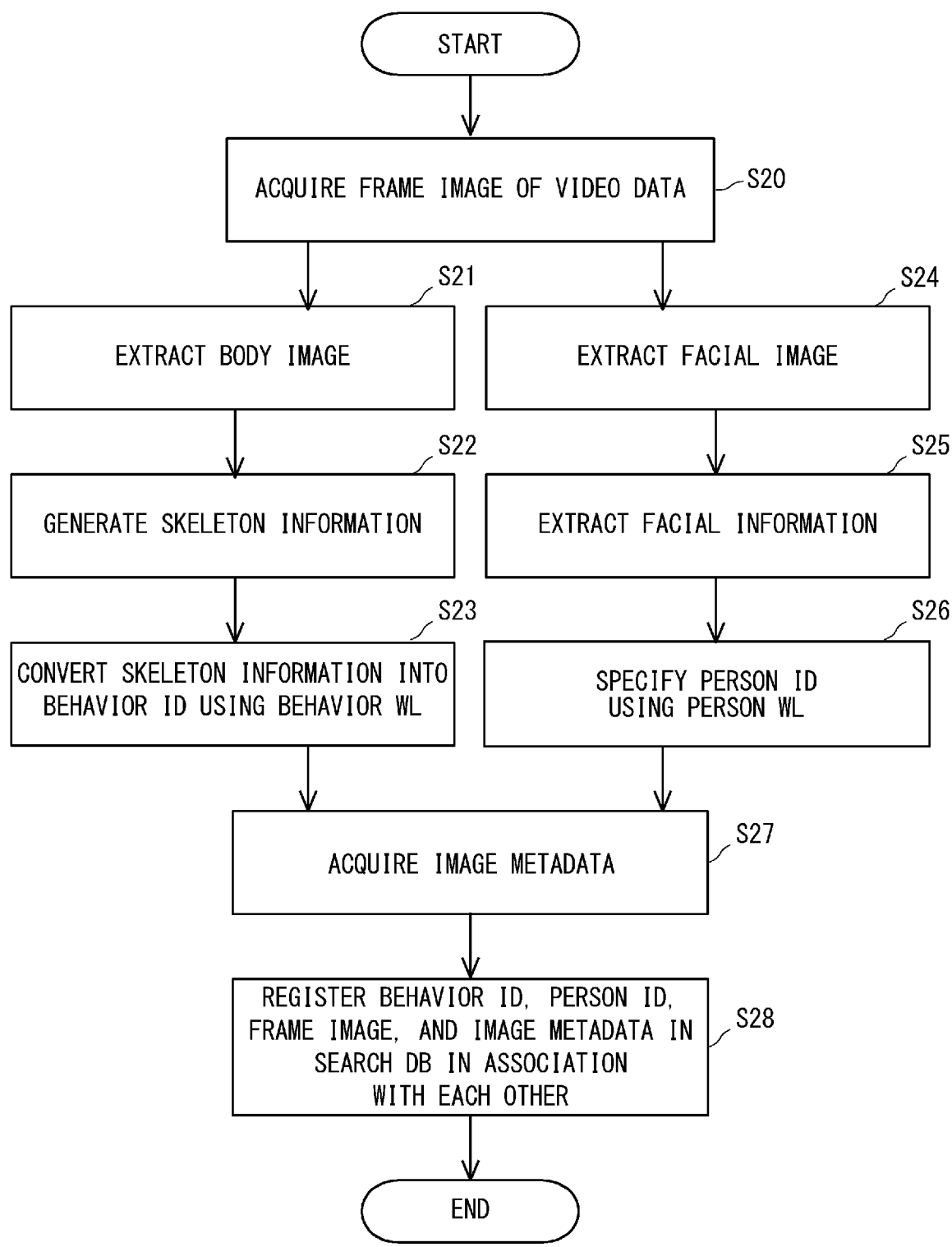
FIG. 4 is a flowchart showing a flow of a video processing method according to the second example embodiment.

FIG. 4 is a flowchart showing a flow of the video processing method according to the second example embodiment. First, the image acquisition unit 101 acquires video data, and acquires a frame image included in the video data (S20). Next, the body image extraction unit 102 extracts a body image from the frame image (S21). Next, the skeleton information generation unit 103 generates skeleton information based on the body image (S22). Next, the behavior conversion unit 104 uses the behavior WL 105 to convert the skeleton information into a behavior ID (S23).

On the other hand, the facial image extraction unit 106 extracts a facial image from the frame image (S24). Next, the facial information extraction unit 107 extracts facial information from the facial image (S25). Next, the person specifying unit 108 uses the person WL 109 to specify a person ID associated with the facial information (S26).

Then, the registration unit 110 acquires image metadata (S27), and registers the behavior ID, the person ID, the frame image, and the image metadata in the search DB 111 in association with each other (S28).

Figure 5:
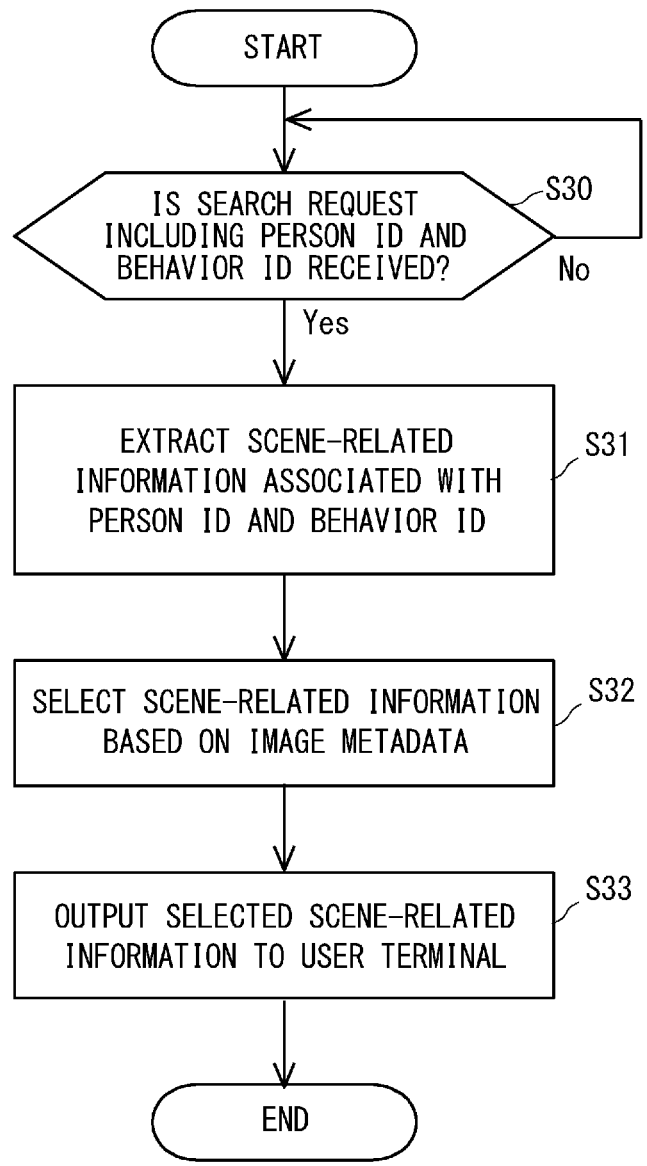
FIG. 5 is a flowchart showing a flow of a search method according to the second example embodiment.

FIG. 5 is a flowchart showing a flow of a search method according to the second example embodiment. First, when receiving the person ID and the behavior ID from the user terminal 300 (Yes in S30), the search unit 112 refers to the search DB 111, and extracts scene-related information associated with the person ID and the behavior ID (S31). Next, the search unit 112 selects the extracted scene-related information based on the image metadata described above (S32). Next, the search unit 112 transmits the selected scene-related information to the user terminal 300, and causes the user terminal 300 to output the information (S33).

According to the second example embodiment as described above, the video processing system 1 can generate the search DB 111 in which simple keywords of the behavior ID and the person ID are associated with the scene-related information related to the frame image. Thus, the user can easily search for desired scene-related information.

In addition, the video processing system 1 can easily specify the behavior ID from the video data by specifying the behavior ID using the skeleton information and the behavior WL 105. The administrator of the video processing apparatus 100 only needs to create the behavior WL 105 by registering the reference image and the reference behavior ID, and does not require a large amount of learning data to specify the behavior ID. Therefore, it is possible to easily accumulate information about a scene, in which a specific person performs specific behavior, in the search DB 111.

Third Example Embodiment

Next, a third example embodiment of the present disclosure will be described. The third example embodiment is characterized in that persons included in video data are subjected to clustering to efficiently specify person IDs. The third example embodiment is effective when a plurality of persons appear in the video data.

Figure 6:
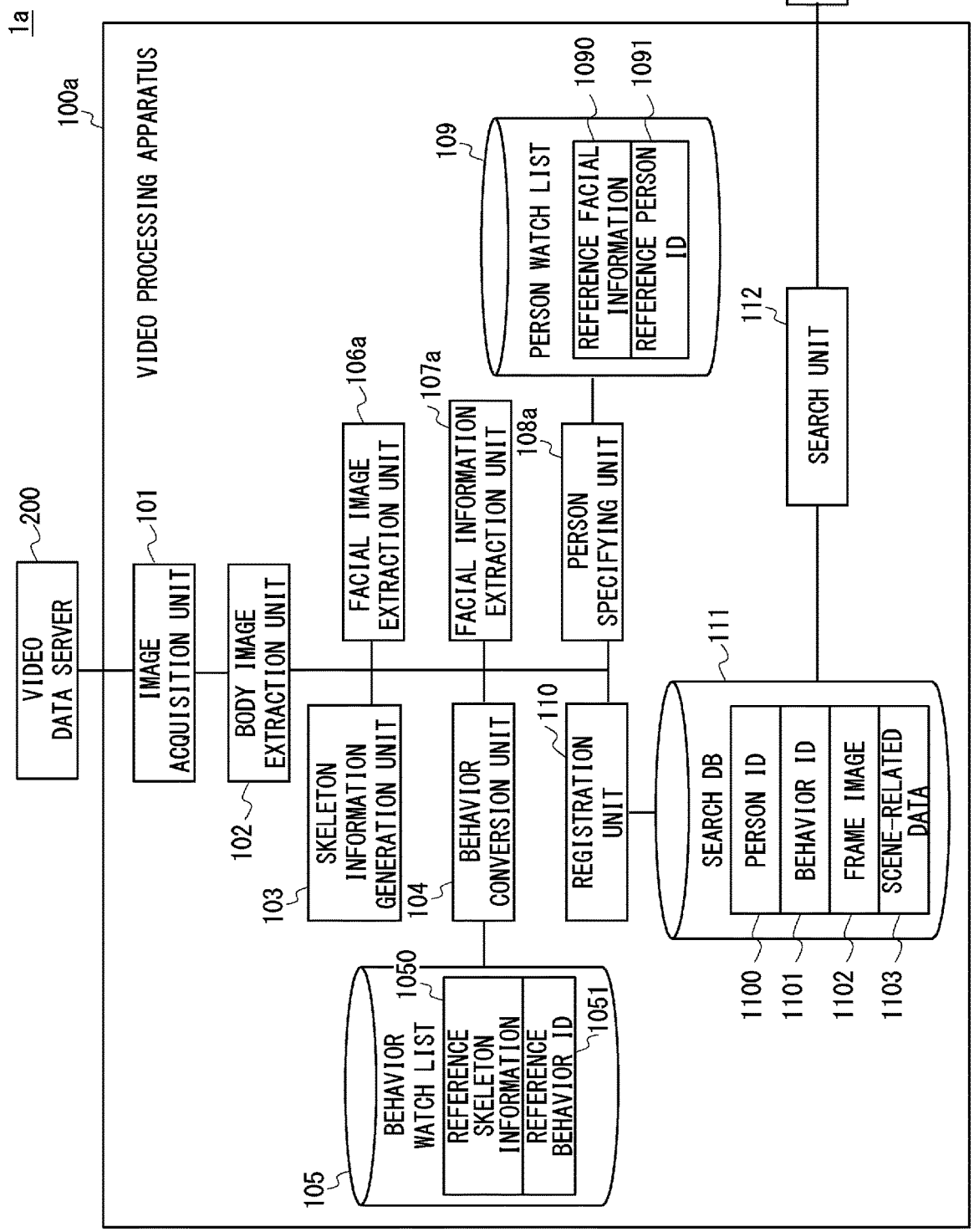
FIG. 6 is a block diagram showing a configuration of a video processing system according to a third example embodiment.

FIG. 6 is a block diagram showing a configuration of a video processing system 1a according to the third example embodiment. The video processing system 1a has basically functions similar to those of the video processing system 1, but differs from the video processing system 1 in that a video processing apparatus 100a is provided instead of the video processing apparatus 100.

The video processing apparatus 100a differs from the video processing apparatus 100 in that a facial image extraction unit 106a, a facial information extraction unit 107a, and a person specifying unit 108a are provided instead of the facial image extraction unit 106, the facial information extraction unit 107, and the person specifying unit 108.

Regarding body images extracted from a plurality of frame images by the body image extraction unit 102, the facial image extraction unit 106a extracts a facial image of a person indicated by the body image included in a certain frame image. Alternatively, the facial image extraction unit 106a extracts a facial image of a person indicated by the body image included in a certain frame image from the body images extracted by the body image extraction unit 102, based on the skeleton information generated by the skeleton information generation unit 103. In this case, the facial image extraction unit 106a may extract the facial image of the person based on a head position of the person indicated by the body image.

The facial information extraction unit 107a extracts facial information from the facial region of the person extracted by the facial image extraction unit 106a. The facial information extraction unit 107a repeats this processing for each of the persons indicated by the plurality of body images included in the plurality of frame images.

The person specifying unit 108a performs clustering on the persons included in the plurality of frame image, based on the facial information extracted by the facial information extraction unit 107a. Then, the person specifying unit 108a assigns a cluster ID as identification information to each cluster. Then, the person specifying unit 108a specifies a person ID for each of the persons included in the plurality of frame images, based on the cluster ID of the cluster subjected to clustering. Specifically, first, for each cluster, the person specifying unit 108a selects at least one facial information belonging to the cluster as facial information representing the cluster. Then, the person specifying unit 108a specifies, from the reference facial information 1090 registered in the person WL 109, reference facial information 1090 of which the degree of similarity with the selected facial information is equal to or greater than a predetermined threshold. Then, the person specifying unit 108a specifies a reference person ID 1091 associated with the specified reference facial information 1090, as a person ID corresponding to the cluster ID.

Mainly, it may not be necessary to specify the person's name when it is desired to grasp the behavior of the same person in the field of surveillance. In this case, the person specifying unit 108a may specify the cluster ID of the cluster subjected to clustering as the person ID for each person included in the plurality of frame images. In this case, the person WL 109 may be omitted.

Figure 7:
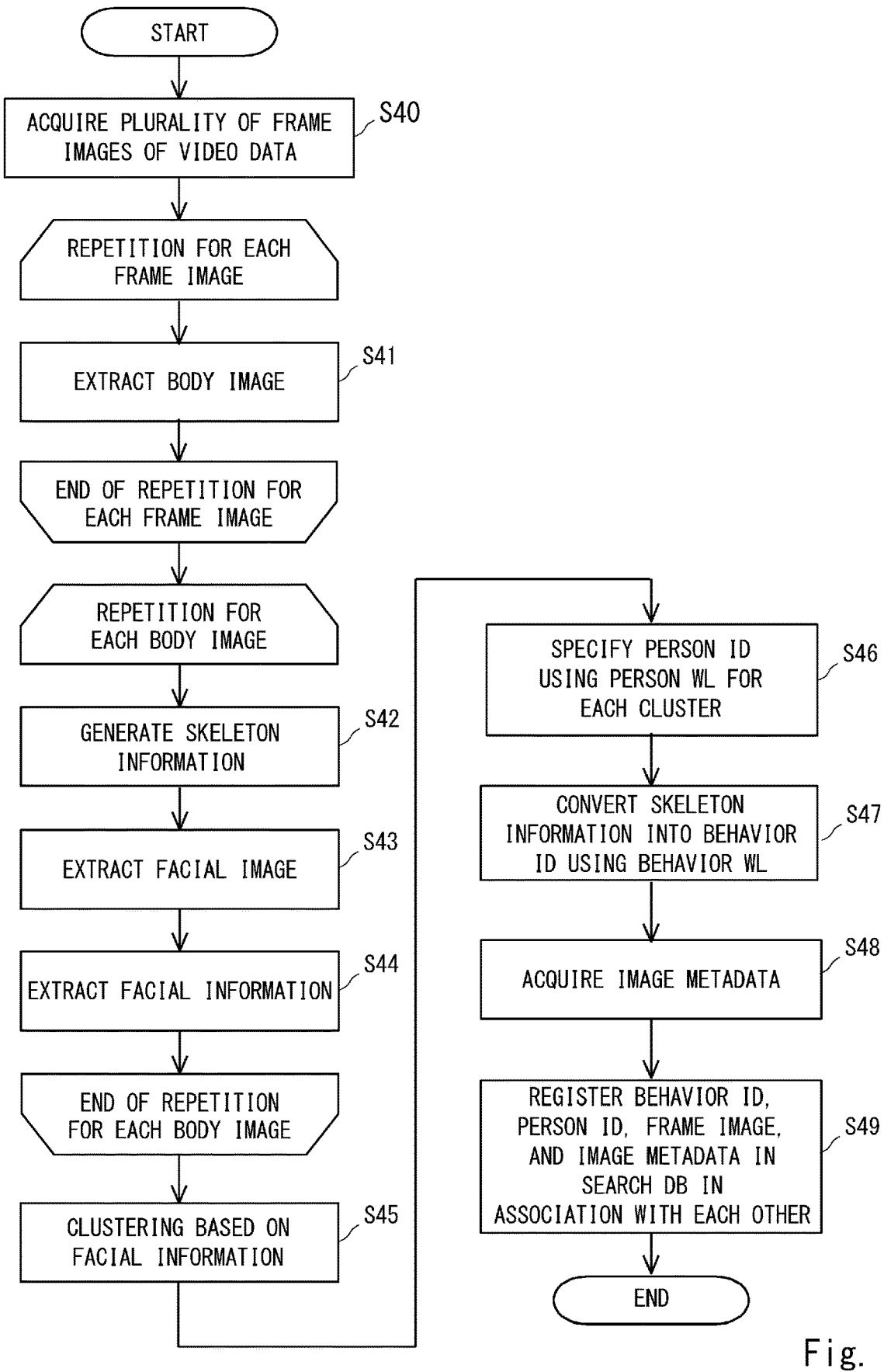
FIG. 7 is a flowchart showing a flow of a video processing method according to the third example embodiment.
Figure 8:
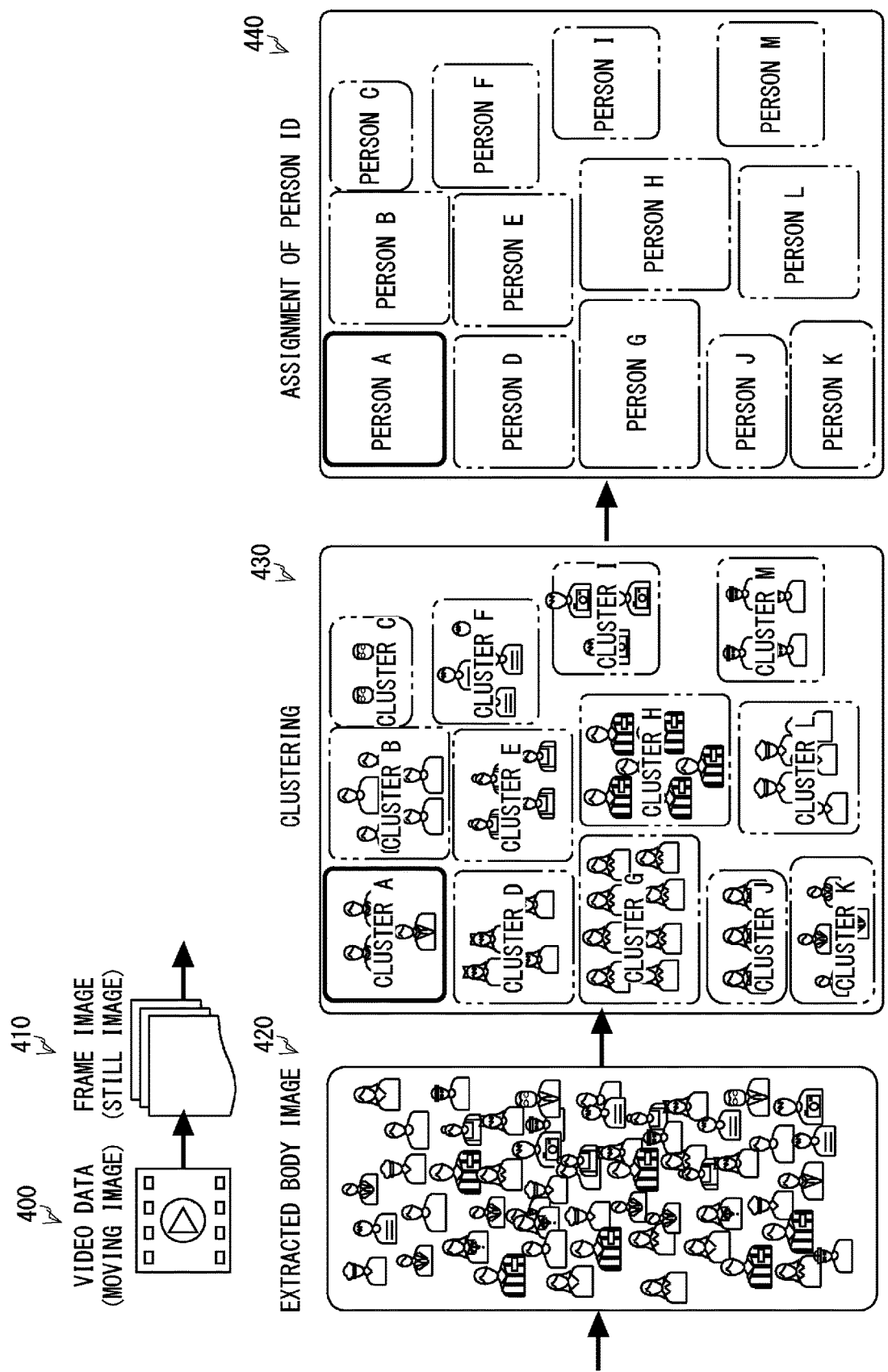
FIG. 8 is a diagram for explaining person specifying processing included in the video processing according to the third example embodiment.
Figure 9:
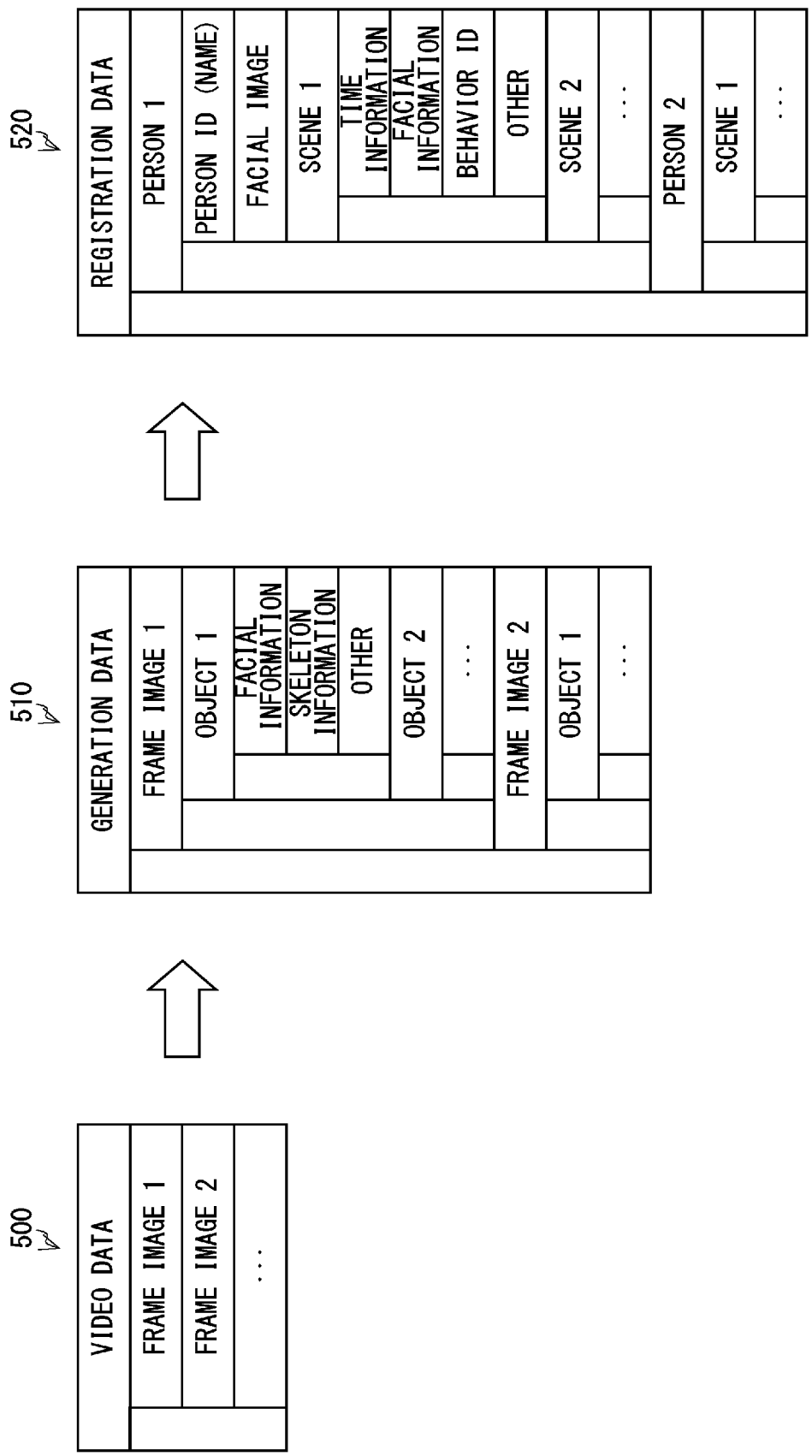
FIG. 9 is a diagram showing an example of a data structure of data generated by the video processing method according to the third example embodiment.

Next, a description will be given with respect to the flow of the video processing method according to the third example embodiment with reference to FIGS. 7, FIG. 8, and FIG. 9. FIG. 7 is a flowchart showing the flow of the video processing method according to the third example embodiment. FIG. 8 is a diagram for explaining person specifying processing included in video processing according to the third example embodiment. FIG. 9 is a diagram showing an example of a data structure of data generated by the video processing method according to the third example embodiment.

First, the image acquisition unit 101 of the video processing apparatus 100a acquires video data, and acquires a plurality of frame images included in the video data (S40). FIG. 8 shows video data (moving image) 400 acquired by the image acquisition unit 101 and a frame image (still image) 410 included in the video data 400. Further, video data 500 shown in FIG. 9 indicates a data structure of the video data acquired from video data server 200 by the image acquisition unit 101. The video data 500 includes a plurality of frame images 1, 2, . . . .

Returning to FIG. 7, the description will be continuously given. After execution of step S40, the body image extraction unit 102 repeats a process of extracting a body image as a person region from the frame image, as indicated by S41, for each frame image. FIG. 8 shows an aggregate 420 of the body images extracted from the plurality of frame images.

Returning to FIG. 7, the description will be continuously given. The video processing apparatus 100a repeats processes indicated by S42 to S44 for each of the extracted body images. First, in step S42, the skeleton information generation unit 103 generates skeleton information from the body image. Next, in step S43, the facial image extraction unit 106a extracts a facial image from the body image. Then, in step S44, the facial information extraction unit 107 extracts facial information from the extracted facial image. Steps S43 and S44 may be executed earlier than step S42, or may be executed in parallel.

In this way, generation data 510 shown in FIG. 9 is generated. For example, information associated with object 1 (body image 1) detected in frame image 1 of the generation data 510 includes facial information, skeleton information, and other metadata.

Then, in step S45 in FIG. 7, the person specifying unit 108a performs clustering on all of the extracted body images, based on the facial information. For example, the person specifying unit 108a performs clustering such that the body images whose degrees of similarity with the facial information associated with the body images are equal to or greater than a predetermined threshold belong to the same cluster. The degree of similarity between the pieces of facial information may be calculated using feature points, such as a center of pupil, nose wings, and corners of mouth, from a rectangular region of the face. Further, degree of similarity between the pieces of facial information may be calculated using feature points, such as unevenness and inclination of eyes and nose, or may be calculated using various features without being limited thereto. At this time, the person specifying unit 108a assigns a cluster ID to each of the clusters. FIG. 8 shows an aggregate 430 of clusters A to M generated in a manner that the aggregate 420 of the body images is subjected to clustering based on the facial information by the person specifying unit 108a.

Then, in step S46 in FIG. 7, the person specifying unit 108a selects at least one piece of facial information corresponding to the body image belonging to a certain cluster of the clusters, and uses the person WL 109 to specify a person ID corresponding to the selected facial information. FIG. 8 shows that person IDs (A to M) 440 are specified for the clusters A to M, respectively, by the person specifying unit 108a.

Then, in step S47 in FIG. 7, the behavior conversion unit 104 converts the skeleton information into the behavior ID for each body image, using the behavior WL 105. The process indicated by S47 may be executed immediately after step S42.

Then, in step S48 in FIG. 7, the registration unit 110 acquires image metadata, and in step S49, registers the behavior ID, the person ID, the frame image, and the image metadata in the search DB 111 in association with each other. Registration data 520 shown in FIG. 9 indicates a data group registered in the search DB 111. As an example, the registration data 520 includes, for each person with the same person ID, a facial image; and time information, facial information, behavior ID, and other image metadata for each scene.

According to the third example embodiment as described above, the video processing apparatus 100a does not collate all of the extracted facial information with the facial information of the person WL 109, but may collate the facial images selected from the facial images of the persons belonging to the cluster presumed to be the same person. Therefore, a computational load is reduced, and the video processing apparatus 100a can efficiently specify the person ID. Thus, the video processing apparatus 100a can accumulate information in the search DB 111 more easily.

Fourth Example Embodiment

Next, a fourth example embodiment of the present disclosure will be described. The fourth example embodiment is characterized by using body feature information in addition to facial information in clustering of persons included in video data. The body feature information indicates an aggregate of feature points of the body, and may be called body information or person data. Thus, even when the face of the person is not detected and only the body is detected in the frame image, such as when the person is facing backward, it is possible to specify the person.

Figure 10:
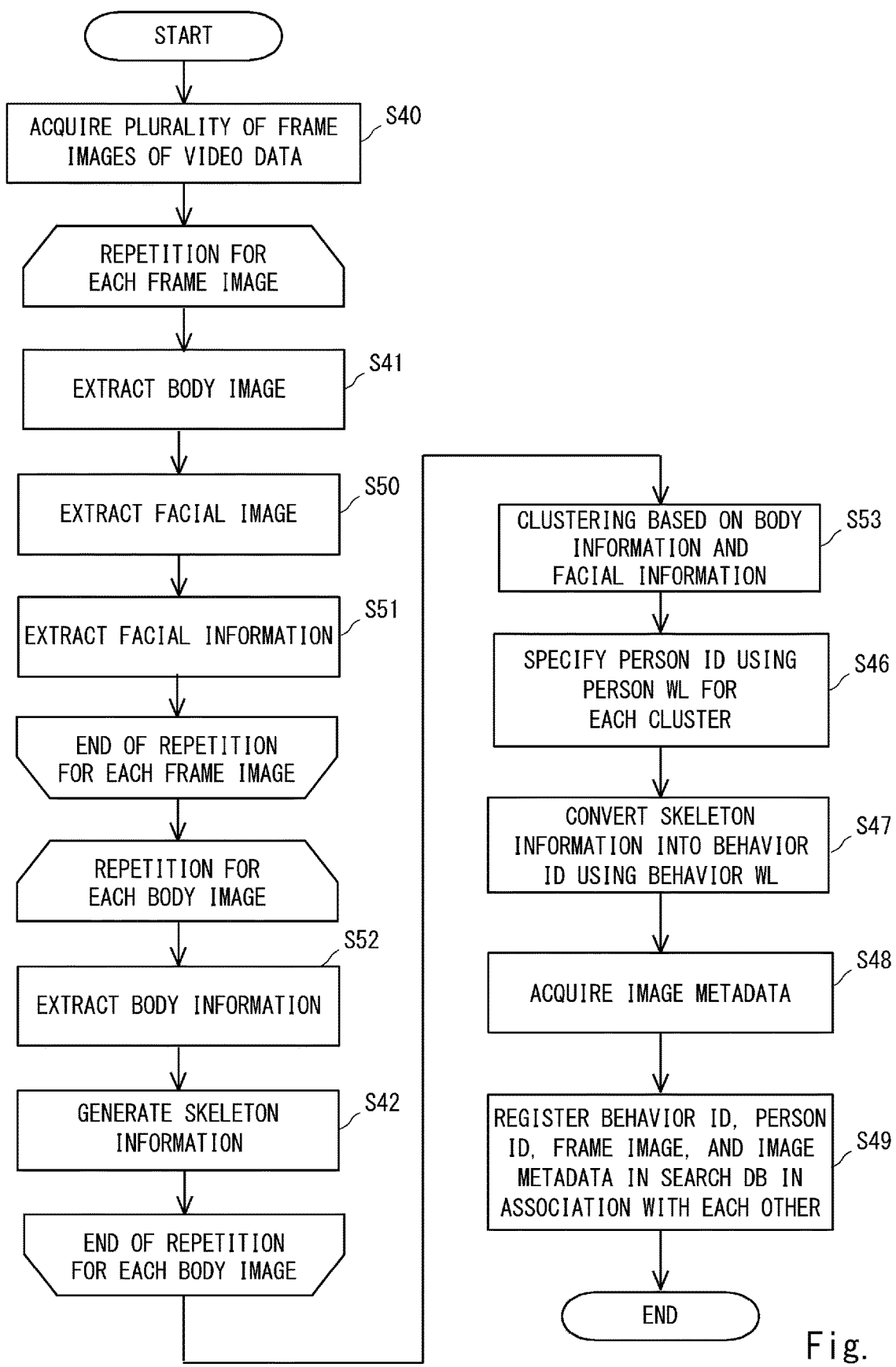
FIG. 10 is a flowchart showing a flow of a video processing method according to a fourth example embodiment.

FIG. 10 is a flowchart showing a flow of a video processing method according to the fourth example embodiment. Steps shown in FIG. 10 are basically the same as the steps shown in FIG. 7, but have S50, S51, S52, and S53 instead of S43, S44, and S45. The same steps as those in FIG. 7 will not be described as appropriate.

The video processing apparatus 100a repeats a process indicated by step S41 and processes indicated by steps S50 and S51 for each frame image. In step S41, the body image extraction unit 102 extracts a body image as a person region from the frame image. In step S50, the facial image extraction unit 106a extracts a facial image from the frame image. Then, in step S51, the facial information extraction unit 107 extracts facial information from the extracted facial image. Steps S50 and S51 may be performed earlier than step S41, or may be performed in parallel with step S41.

Next, the video processing apparatus 100a repeats processes indicated by steps S52 and S42 for each of the extracted body images. In step S52, the person specifying unit 108a of the video processing apparatus 100a extracts body information from the body image. Then, in step S42, the skeleton information generation unit 103 generates skeleton information from the body image.

Next, in step S53, the person specifying unit 108a compares the facial image with the body image between different frame images, and performs clustering on all of the extracted body images (corresponding to persons), based on the facial information and the body information. More specifically, first, the person specifying unit 108a performs clustering on the body images based on the body information. A degree of similarity of body information between the body images belonging to each cluster is equal to or greater than a predetermined threshold. On the other hand, the person specifying unit 108a performs clustering of facial images based on facial information. A degree of similarity of facial information between the facial images belonging to each cluster is equal to or greater than a predetermined threshold. Then, the person specifying unit 108a associates the facial image and the body image with each other. Specifically, when the facial image is together with the body image, the person specifying unit 108a associates the facial image and the body image with each other. Then, when the facial image is associated with the body image included in any one of a plurality of frame images, the person specifying unit 108a performs, as an identical cluster, clustering on a cluster subjected to clustering based on the facial information of the facial image and a cluster subjected to clustering based on the body information of the body image. In other words, the person specifying unit 108a integrates the clusters, and estimates that the body image and the facial image belonging to the same cluster belong to the same person. Thus, even when the face is not visible or the face is not detected, it is possible to easily specify the person from the body image. The following steps are the same as those in FIG. 7.

Figure 11:
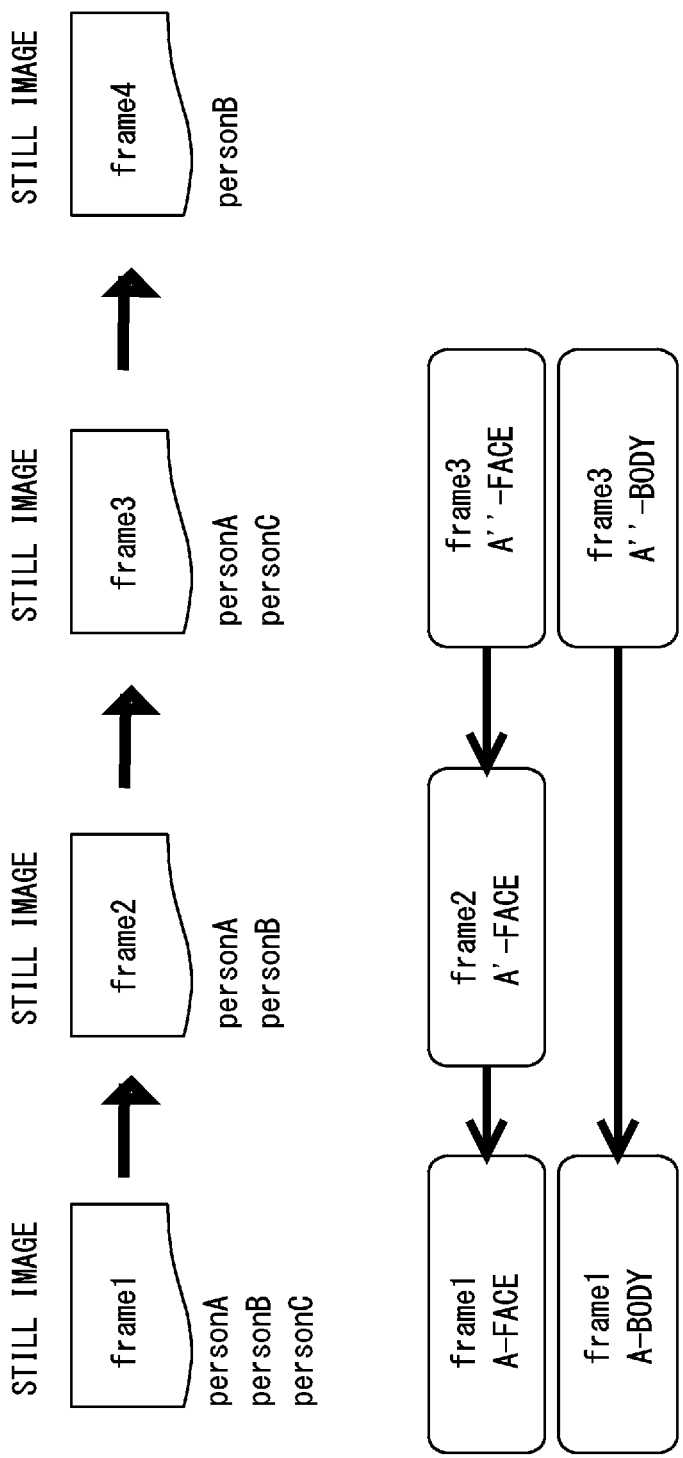
FIG. 11 is a diagram showing an example of comparing different frame images and performing an association between facial images and an association between body images according to the fourth example embodiment.
Figure 12:
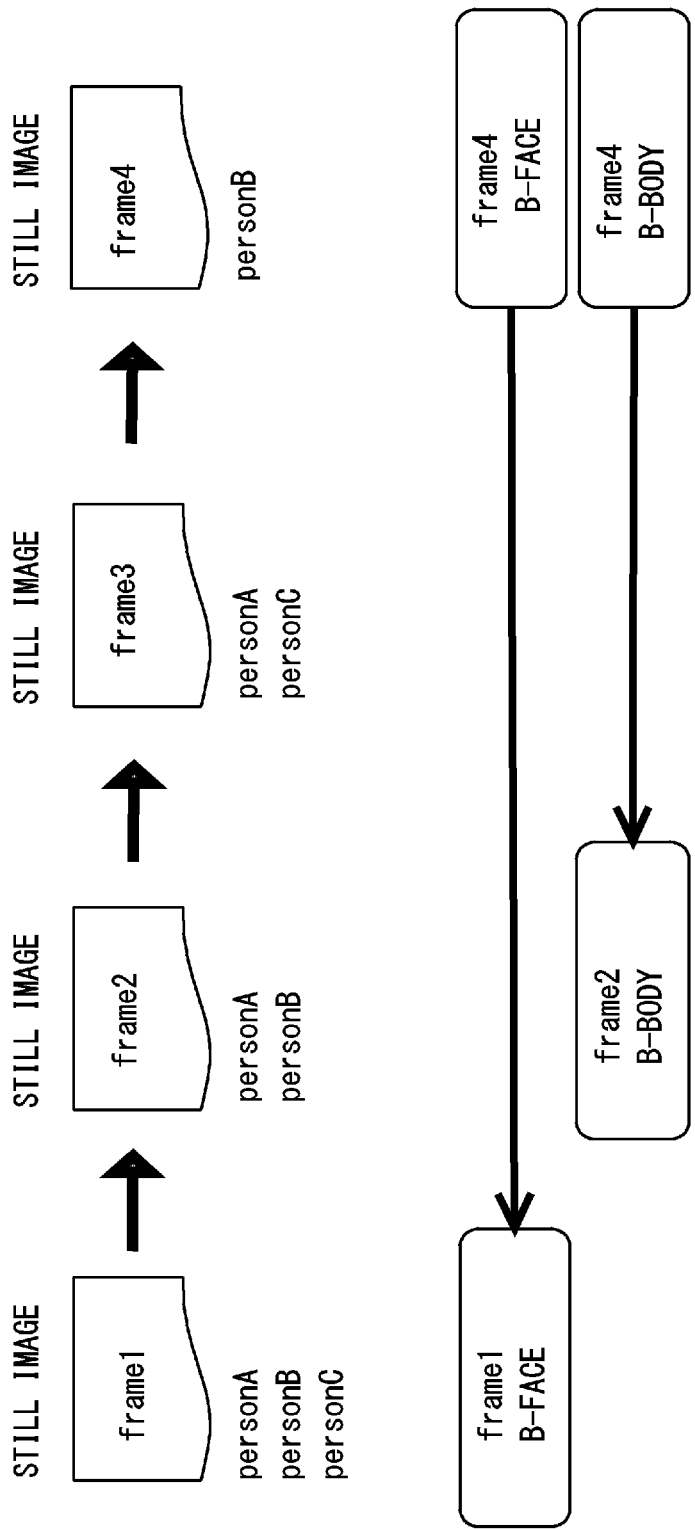
FIG. 12 is a diagram showing an example of comparing different frame images and performing an association between facial images and an association between body images according to the fourth example embodiment.

FIGS. 11 and 12 are diagrams showing an example of comparing different frame images and performing an association between facial images and an association between body images according to the fourth example embodiment. In FIGS. 11 and 12, it is assumed that persons A, B, and C are reflected in frame image 1. It is assumed that persons A and B are reflected in frame image 2. It is assumed that persons A and C are reflected in frame image 3. It is assumed that a person B is reflected in frame image 4.

In FIG. 11, it is assumed that a video is flowing in this order of frame images 1, 2, 3, and 4. In FIG. 11, it is assumed that the person specifying unit 108a associates the facial image and the body image of the person A with each other. In FIG. 11, it is assumed that a face and a body of the person A are reflected in frame image 1. It is assumed that a face of the person A is reflected in frame image 2. It is assumed that the face and the body of the person A are reflected in frame image 3.

In the example of FIG. 11, even when a facial expression of the person A in frame image 1 is different from a facial expression of a person A' in frame image 2, the person A in frame image 1 and the person A' in frame image 2 can be clustered as the same person. Further, even when a clothing of the person A in frame image 1 is different from a clothing of a person A" in frame image 3, the person A in frame image 1 and the person A' in frame image 2 are the same. Therefore, based on the facial image in frame image 2 and the facial image in frame image 3, the person A" in frame image 3 can also be clustered together with the person A in frame image 1 and frame image 2 as the same person.

In FIG. 12, it is assumed that a facial image and a body image of a person B are associated with each other. It is assumed that only a face of the person B is reflected in frame image 1 and only a body of the person B is reflected in frame image 2. Further, it is assumed that the face and the body of the person B are reflected in frame image 4, and the person specifying unit 108*a* associates the facial image and the body image of the person B with each other. At this time, the person specifying unit 108*a* can collate the facial image in frame image 1 and the body image in frame image 2 as those of the person B, based on the facial image and the body image of the person B associated with each other in frame image 4.

In this way, the person specifying unit 108*a* compares the facial image and the body image between different frame images based on the facial image included in the frame image and the body image included in the frame image, and specifies a person ID. By using the body image used to generate the skeleton information to specify the person, it is possible to improve accuracy of specifying the person while reducing a computational load.

The person specifying unit 108*a* may determine, based on the behavior ID generated from the skeleton information, whether the body image is used for the processing of specifying the person ID. For example, when the behavior ID is a predetermined behavior ID (for example, when the behavior ID is "crouching down" or "looking back"), the person specifying unit 108*a* may specify the person ID based on the facial image and the body image. Thus, it is possible to achieve both reduction in computational load and improvement in accuracy of specifying the person while minimizing execution of the extraction processing of the body information.

Fifth Example Embodiment

Next, a fifth example embodiment of the present disclosure will be described. The fifth example embodiment is characterized in that the video processing apparatus registers clothing information in the search DB 111 in association with the person ID.

Figure 13:
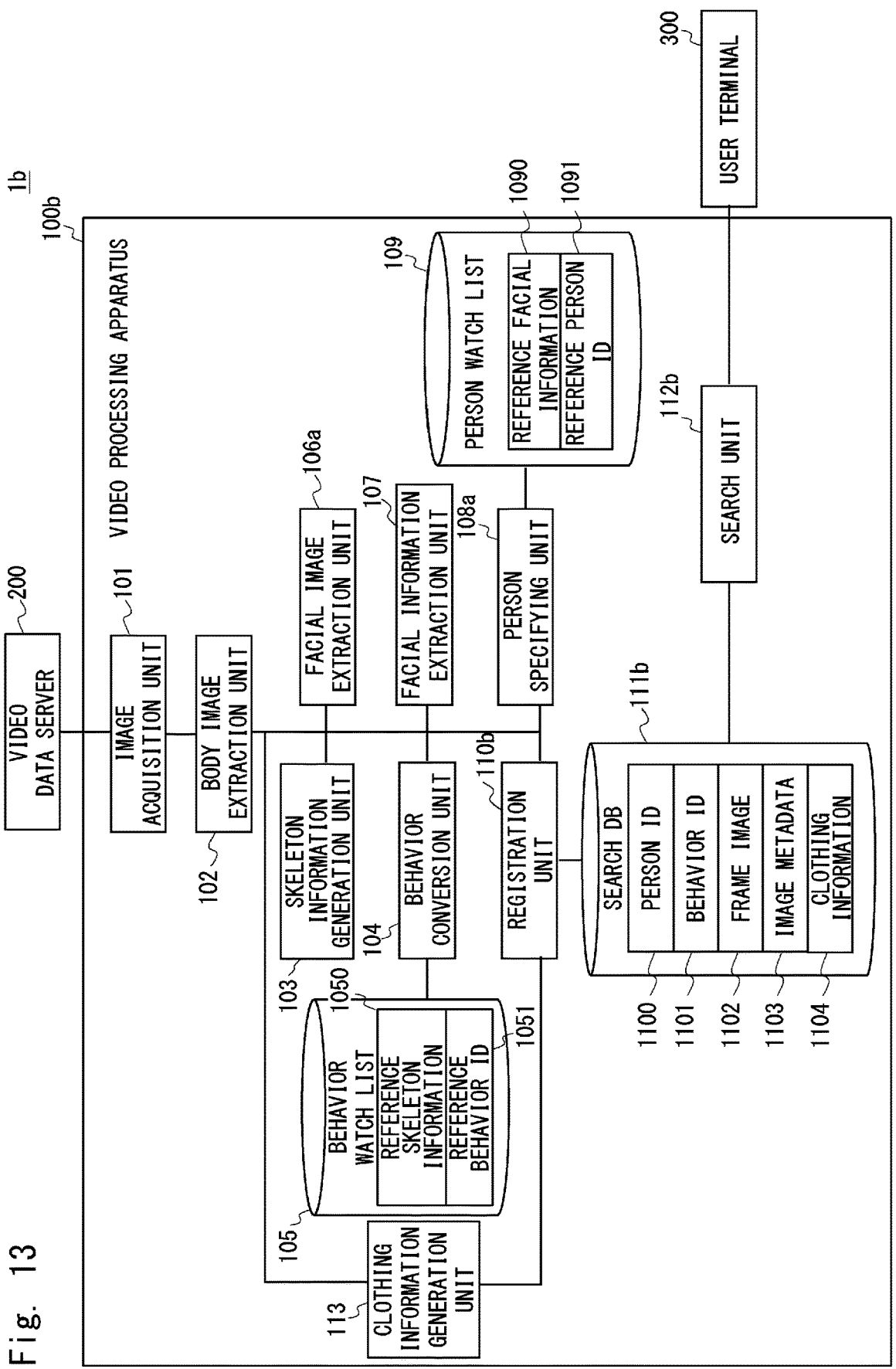
FIG. 13 is a block diagram showing a configuration of a video processing system according to a fifth example embodiment.

FIG. 13 is a block diagram showing a configuration of a video processing system 1*b* according to the fifth example embodiment. The video processing system 1*b* has basically functions similar to those of the video processing system 1*a*, but a video processing apparatus 100*b* is provided instead of the video processing apparatus 100*a*.

The video processing apparatus 100*b* differs from the video processing apparatus 100*a* in that a registration unit 110*b*, a search DB 111*b*, a search unit 112*b*, and a clothing information generation unit 113 are provided instead of the registration unit 110, the search DB 111, and the search unit 112.

The clothing information generation unit 113 is also called a clothing information generation means. The clothing information generation unit 113 generates, using image processing, clothing information of the person from the body image of the person included in the frame image extracted by the body image extraction unit 102. The clothing information includes information indicating types of clothing, for example, long sleeves, short sleeves, pants, short pants, and skirts. The clothing may include information indicating a type of luggage such as a bag, or information indicating a type of uniform of a sports team. In addition, the clothing information may include information indicating a color of the clothing.

The registration unit 110*b* registers clothing information 1104 in the search DB 111*b* in association with a person ID 1100, a behavior ID 1101, a frame image 1102, and an image metadata 1103.

The search DB 111*b* stores the clothing information 1104 in association with the person ID 1100, the behavior ID 1101, the frame image 1102, and the image metadata 1103. In the fifth example embodiment, the behavior ID 1101 may be omitted. In this case, the skeleton information generation unit 103, the behavior conversion unit 104, and the behavior WL 105 may be omitted from the video processing apparatus 100*b*.

When receiving a search request including at least one of the person ID, the behavior ID, and the clothing information from the user terminal 300, the search unit 112*b* acquires scene-related information associated with the information included in the search request, from the search DB 111*b*. For example, when receiving a search request including all of the person ID, the behavior ID, and the clothing information from the user terminal 300, the search unit 112*b* acquires scene-related information associated with all of them, from the search DB 111*b*. For example, when receiving a search request including the person ID and the clothing information from the user terminal 300, the search unit 112*b* acquires scene-related information associated with the person ID and the clothing information, from the search DB 111*b*. Then, the search unit 112*b* transmits the acquired scene-related information to the user terminal 300, as a search result.

Figure 14:
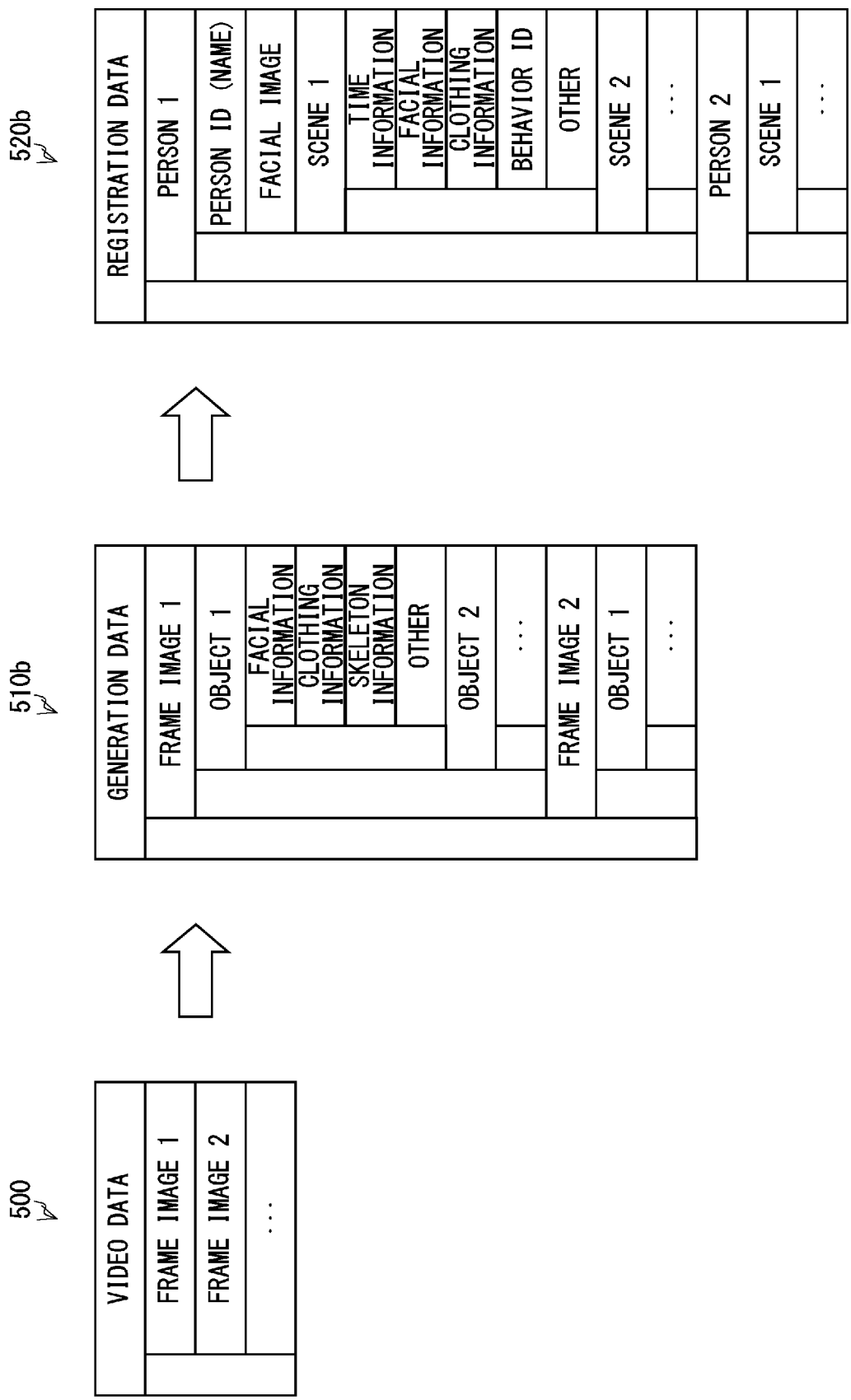
FIG. 14 is a diagram showing an example of a data structure of data generated by the video processing method according to the fifth example embodiment.

FIG. 14 is a diagram showing an example of a data structure of data generated by the video processing method according to the fifth example embodiment. Here, processing of generating the clothing information by the clothing information generation unit 113 may be executed in parallel with step S42 in FIG. 10, for example. Thus, as information associated with the object detected in a frame image of generation data 510*b* shown in FIG. 14, clothing information is added in addition to facial information, skeleton information, and other metadata. Then, registration data 520*b* includes the clothing information in addition to the facial image for each person with the same person ID; and time information, facial information, behavior ID, and other metadata for each scene.

According to the fifth example embodiment as described above, the video processing system 1*b* can generate the search DB in which simple keywords, such as the clothing information and the person ID, are associated with the scene-related information related to the frame image. Therefore, it is possible to easily accumulate information about a scene, in which a specific person wears a specific clothing, in the search DB. Thus, the user can easily search for desired scene-related information.

The above-described example embodiments have been described as hardware configuration, but are not limited thereto. The present disclosure can also implement any processing by causing a processor to execute a computer program.

In the above-described examples, the program includes instructions (or software codes) that, when loaded into a computer, causes a computer to perform one or more functions described in the example embodiments. The program may be stored in a non-transitory computer-readable medium or a tangible storage medium. Examples of computer-readable media or tangible storage media may include, but not be limited to, a random-access memory (RAM), a read-only memory (ROM), a flash memory, a solid-state drive (SSD) or other memory technology, a CD-ROM, a digital versatile disc (DVD), a Blu-ray (registered trademark) disc or other optical storages, a magnetic cassette, a magnetic tape, and a magnetic storage or other magnetic storage devices. The program may be transmitted on a transitory computer-readable medium or a communication medium. Examples of transitory computer-readable media or communication media may include, but not be limited to, electric signals, optical signals, acoustic signals, or other forms of propagated signals.

The present disclosure is not limited to the above-described example embodiments, and can be modified as appropriate without departing from the scope and spirit of the invention.

Some or all of the above-described example embodiments may also be described as in the following Supplementary notes, but are not limited to the following.

(Supplementary note 1)

A video processing system comprising:
image acquisition means for acquiring at least one frame image included in video data;
skeleton information generation means for generating skeleton information based on a body region of a person included in the at least one frame image;
behavior conversion means for converting the skeleton information into a behavior ID;
person specifying means for specifying, based on a facial region of the person included in the at least one frame image, a person ID for identifying features of a person estimated to be an identical person; and
registration means for registering the behavior ID, the person ID, and scene-related information related to the at least one frame image in a database in association with each other.

(Supplementary note 2)

The video processing system according to Supplementary note 1, further comprising search means for, when receiving a search request including a person ID and a behavior ID, outputting scene-related information associated with the person ID and the behavior ID included in the search request.

(Supplementary note 3)

The video processing system according to Supplementary note 2, in which the search means selects one or a plurality of pieces of scene-related information from the scene-related information associated with the person ID and the behavior ID included in the search request, and outputs the selected one or plurality of pieces of scene-related information.

(Supplementary note 4)

The video processing system according to Supplementary note 3, in which the search means selects the one or plurality of pieces of scene-related information from the scene-related information associated with the person ID and the behavior ID included in the search request, based on metadata of the at least one frame image corresponding to the scene-related information, the metadata excluding the person ID and the behavior ID.

(Supplementary note 5)

The video processing system according to any one of Supplementary notes 1 to 4, in which the behavior conversion means specifies, from a plurality of pieces of reference skeleton information registered in advance in a behavior watch list and each associated with a reference behavior ID, reference skeleton information in which a degree of similarity with the generated skeleton information is equal to or greater than a predetermined threshold, and specifies a reference behavior ID associated with the specified reference skeleton information, as the behavior ID.

(Supplementary note 6)

The video processing system according to any one of Supplementary notes 1 to 5, in which
the image acquisition means acquires a plurality of frame images, and
the person specifying means performs, based on facial feature information extracted from a facial region of each of persons included in each of the plurality of frame images, clustering of the persons included in the plurality of frame images, and specifies a person ID for each of the persons included in the plurality of frame images based on identification information of a cluster which is subjected to the clustering.

(Supplementary note 7)

The video processing system according to Supplementary note 6, in which the person specifying means specifies the person ID based on the facial region included in each of the plurality of frame images and a body region included in each of the plurality of frame images.

(Supplementary note 8)

The video processing system according to Supplementary note 7, in which
the image acquisition means acquires a plurality of frame images, and
the person specifying means performs, based on body feature information extracted from the body region of each of persons included in each of the plurality of frame images and the facial feature information extracted from the facial region of each of the persons included in each of the plurality of frame images, clustering of the persons included in the plurality of frame images, and specifies a person ID based on identification information of a cluster which is subjected to the clustering.

(Supplementary note 9)

The video processing system according to Supplementary note 8,
in which, when the facial region is together with the body region included in any one of the plurality of frame images, the person specifying means performs, as an identical cluster, clustering on a cluster in which a degree of similarity with the body feature information extracted from the body region is equal to or greater than a predetermined threshold and a cluster in which a degree of similarity with the facial feature information extracted from the facial region is equal to or greater than a predetermined threshold.

(Supplementary note 10)

The video processing system according to any one of Supplementary notes 1 to 9, further comprising clothing information generation means for generating clothing information of the person from the body region of the person included in the at least one frame image,
in which the registration means registers the clothing information, the person ID, and the scene-related information related to the at least one frame image in the database in association with each other.

(Supplementary note 11)

A video processing method comprising:
acquiring at least one frame image included in video data;
generating skeleton information based on a body region of a person included in the at least one frame image;

converting the skeleton information into a behavior ID;
specifying, based on a facial region of the person included in the at least one frame image, a person ID for identifying features of a person estimated to be an identical person; and
registering the behavior ID, the person ID, and scene-related information related to the at least one frame image in a database in association with each other.

(Supplementary note 12)

A non-transitory computer-readable medium storing a program that causes a computer to execute:
an image acquisition process of acquiring at least one frame image included in video data;
a skeleton information generation process of generating skeleton information based on a body region of a person included in the at least one frame image;
a behavior conversion process of converting the skeleton information into a behavior ID;
a person specifying process of specifying, based on a facial region of the person included in the at least one frame image, a person ID for identifying features of a person estimated to be an identical person; and
a registration process of registering the behavior ID, the person ID, and scene-related information related to the at least one frame image in a database in association with each other.

REFERENCE SIGNS LIST 1, 1a, 1b, 10 VIDEO PROCESSING SYSTEM
11, 101 IMAGE ACQUISITION UNIT
13, 103 SKELETON INFORMATION GENERATION UNIT
14, 104 BEHAVIOR CONVERSION UNIT
18, 108, 108a PERSON SPECIFYING UNIT
20 REGISTRATION UNIT
100, 100a, 100b VIDEO PROCESSING APPARATUS
102 BODY IMAGE EXTRACTION UNIT
105 BEHAVIOR WL
1050 REFERENCE SKELETON INFORMATION
1051 REFERENCE BEHAVIOR ID
106, 106a FACIAL IMAGE EXTRACTION UNIT
107, 107a FACIAL INFORMATION EXTRACTION UNIT
109 PERSON WL
1090 REFERENCE FACIAL INFORMATION
1091 REFERENCE PERSON ID
110, 110b REGISTRATION UNIT
111, 111b SEARCH DB
1100 PERSON ID
1101 BEHAVIOR ID
1102 FRAME IMAGE
1103 IMAGE METADATA
1104 CLOTHING INFORMATION
112, 112b SEARCH UNIT
113 CLOTHING INFORMATION GENERATION UNIT
200 VIDEO DATA SERVER
300 USER TERMINAL
500 VIDEO DATA
510, 510b GENERATION DATA
520, 520b REGISTRATION DATA

What is claimed is:

1. A video processing system comprising at least one processor, wherein the processor is configured to:
acquire at least one frame image included in video data;
generate skeleton information based on a body region of a person included in the at least one frame image;
convert the skeleton information into a behavior ID;
specify, based on a facial region of the person included in the at least one frame image, a person ID for identifying features of a person estimated to be an identical person; and
register the behavior ID, the person ID, and scene-related information related to the at least one frame image in a database in association with each other.

2. The video processing system according to claim 1, wherein the processor is configured to, when receiving a search request including a person ID and a behavior ID, output scene-related information associated with the person ID and the behavior ID included in the search request.

3. The video processing system according to claim 2, wherein the processor is configured to select one or a plurality of pieces of scene-related information from the scene-related information associated with the person ID and the behavior ID included in the search request, and outputs the selected one or plurality of pieces of scene-related information.

4. The video processing system according to claim 3, wherein the processor is configured to select the one or plurality of pieces of scene-related information from the scene-related information associated with the person ID and the behavior ID included in the search request, based on metadata of the at least one frame image corresponding to the scene-related information, the metadata excluding the person ID and the behavior ID.

5. The video processing system according to claim 1, wherein the processor is configured to specify, from a plurality of pieces of reference skeleton information registered in advance in a behavior watch list and each associated with a reference behavior ID, reference skeleton information in which a degree of similarity with the generated skeleton information is equal to or greater than a predetermined threshold, and specifies a reference behavior ID associated with the specified reference skeleton information, as the behavior ID.

6. The video processing system according to claim 1, wherein the processor is configured to:
acquire a plurality of frame images; and
perform, based on facial feature information extracted from a facial region of each of persons included in each of the plurality of frame images, clustering of the persons included in the plurality of frame images, and specifies a person ID for each of the persons included in the plurality of frame images based on identification information of a cluster which is subjected to the clustering.

7. The video processing system according to claim 6, wherein the processor is configured to specify the person ID based on the facial region included in each of the plurality of frame images and a body region included in each of the plurality of frame images.

8. The video processing system according to claim 7, wherein the processor is configured to:
acquire a plurality of frame images, and
perform, based on body feature information extracted from the body region of each of persons included in each of the plurality of frame images and the facial feature information extracted from the facial region of each of the persons included in each of the plurality of frame images, clustering of the persons included in the plurality of frame images, and specifies a person ID based on identification information of a cluster which is subjected to the clustering.

9. The video processing system according to claim 8, wherein the processor is configured to, when the facial region is together with the body region included in any one of the plurality of frame images, perform as an identical cluster, clustering on a cluster in which a degree of similarity with the body feature information extracted from the body region is equal to or greater than a predetermined threshold and a cluster in which a degree of similarity with the facial feature information extracted from the facial region is equal to or greater than a predetermined threshold.

10. The video processing system according to claim 1, the processor is configured to:
generate clothing information of the person from the body region of the person included in the at least one frame image; and
register the clothing information, the person ID, and the scene-related information related to the at least one frame image in the database in association with each other.

11. A video processing method performed by a computer, wherein the method comprises:
acquiring at least one frame image included in video data;
generating skeleton information based on a body region of a person included in the at least one frame image;
converting the skeleton information into a behavior ID;
specifying, based on a facial region of the person included in the at least one frame image, a person ID for identifying features of a person estimated to be an identical person; and
registering the behavior ID, the person ID, and scene-related information related to the at least one frame image in a database in association with each other.

12. A non-transitory computer-readable medium storing a program that causes a computer to execute:
an image acquisition process of acquiring at least one frame image included in video data;
a skeleton information generation process of generating skeleton information based on a body region of a person included in the at least one frame image;
a behavior conversion process of converting the skeleton information into a behavior ID;
a person specifying process of specifying, based on a facial region of the person included in the at least one frame image, a person ID for identifying features of a person estimated to be an identical person; and
a registration process of registering the behavior ID, the person ID, and scene-related information related to the at least one frame image in a database in association with each other.

13. The video processing method according to claim 11, wherein the method comprises, when receiving a search request including a person ID and a behavior ID, outputting scene-related information associated with the person ID and the behavior ID included in the search request.

14. The video processing method according to claim 13, wherein the method comprises selecting one or a plurality of pieces of scene-related information from the scene-related information associated with the person ID and the behavior ID included in the search request, and outputs the selected one or plurality of pieces of scene-related information.

15. The video processing method according to claim 14, wherein the method comprises selecting the one or plurality of pieces of scene-related information from the scene-related information associated with the person ID and the behavior ID included in the search request, based on metadata of the at least one frame image corresponding to the scene-related information, the metadata excluding the person ID and the behavior ID.

16. The video processing method according to claim 11, wherein the method comprises specifying, from a plurality of pieces of reference skeleton information registered in advance in a behavior watch list and each associated with a reference behavior ID, reference skeleton information in which a degree of similarity with the generated skeleton information is equal to or greater than a predetermined threshold, and specifies a reference behavior ID associated with the specified reference skeleton information, as the behavior ID.

17. The non-transitory computer-readable medium according to claim 12, wherein the program causes the computer to, when receiving a search request including a person ID and a behavior ID, output scene-related information associated with the person ID and the behavior ID included in the search request.

18. The non-transitory computer-readable medium according to claim 17, wherein the program causes the computer to select one or a plurality of pieces of scene-related information from the scene-related information associated with the person ID and the behavior ID included in the search request, and outputs the selected one or plurality of pieces of scene-related information.

19. The non-transitory computer-readable medium according to claim 18, wherein the program causes the computer to select the one or plurality of pieces of scene-related information from the scene-related information associated with the person ID and the behavior ID included in the search request, based on metadata of the at least one frame image corresponding to the scene-related information, the metadata excluding the person ID and the behavior ID.

20. The non-transitory computer-readable medium according to claim 12, wherein the program causes the computer to specify, from a plurality of pieces of reference skeleton information registered in advance in a behavior watch list and each associated with a reference behavior ID, reference skeleton information in which a degree of similarity with the generated skeleton information is equal to or greater than a predetermined threshold, and specifies a reference behavior ID associated with the specified reference skeleton information, as the behavior ID.

* * * * *